US010751673B2

(12) United States Patent
Anderson et al.

(10) Patent No.: US 10,751,673 B2
(45) Date of Patent: Aug. 25, 2020

(54) AERATING LANCE ASSEMBLY AND AERATION TANK INCORPORATING SAME

(71) Applicant: AEROFLOAT (HOLDINGS) PTY LTD, Taren Point, New South Wales (AU)

(72) Inventors: Raymond Anderson, Caringbah (AU); Michael Anderson, Gymea Bay (AU)

(73) Assignee: AEROFLOAT (HOLDINGS) PTY LTD (AU)

( * ) Notice: Subject to any disclaimer, the term of this patent is extended or adjusted under 35 U.S.C. 154(b) by 32 days.

(21) Appl. No.: 16/300,034

(22) PCT Filed: May 9, 2017

(86) PCT No.: PCT/AU2017/000102
§ 371 (c)(1),
(2) Date: Nov. 8, 2018

(87) PCT Pub. No.: WO2017/193156
PCT Pub. Date: Nov. 16, 2017

(65) Prior Publication Data
US 2019/0143280 A1    May 16, 2019

(30) Foreign Application Priority Data

May 9, 2016   (AU) .................................. 2016901714

(51) Int. Cl.
*B01F 3/04*    (2006.01)
*C02F 3/02*    (2006.01)
(Continued)

(52) U.S. Cl.
CPC ............ *B01F 3/04248* (2013.01); *C02F 3/08* (2013.01); *C02F 3/201* (2013.01);
(Continued)

(58) Field of Classification Search
CPC ........ C02F 3/08; C02F 3/201; C02F 2303/02; B01F 3/04248; B01F 2003/04148;
(Continued)

(56) References Cited

U.S. PATENT DOCUMENTS 3,837,629 A    9/1974   Matras et al.
3,989,627 A    11/1976  Crandall
(Continued)

FOREIGN PATENT DOCUMENTS

EP             1493717 A1    1/2005

OTHER PUBLICATIONS

European Application No. 17795177.9-1019 / 3455174 PCT/AU2017000102 dated Dec. 9, 2019, pp. 9.
(Continued)

*Primary Examiner* — Thomas M Lithgow
(74) *Attorney, Agent, or Firm* — Dinsmore & Shohl LLP

(57) ABSTRACT

The present invention relates to the field of fluid aeration and, in particular, fluid aeration in a tank of the type having a fluid aerator or aerators requiring removal for cleaning and/or maintenance. The aeration tank of the present invention may be a Moving Bed Bioreactor or Moving Bed Biofilm Reactor (MBBR) tank forming part of an MBBR wastewater treatment system, although the aeration tank of the present invention may also have utility in other applications. The invention further relates to an aerating lance assembly for use in an aeration tank.

17 Claims, 14 Drawing Sheets

(51) Int. Cl.
*C02F 3/20* (2006.01)
*C02F 3/08* (2006.01)

(52) U.S. Cl.
CPC ............... *B01F 2003/04148* (2013.01); *B01F 2003/04177* (2013.01); *B01F 2003/04184* (2013.01); *B01F 2003/04276* (2013.01); *B01F 2003/04872* (2013.01); *C02F 2303/02* (2013.01); *Y02W 10/15* (2015.05)

(58) Field of Classification Search
CPC .. B01F 2003/04177; B01F 2003/04276; B01F 2003/04184; B01F 2003/04872; Y02W 10/15
USPC ........................ 210/220, 620; 261/121.1, 124
See application file for complete search history.

(56) References Cited

U.S. PATENT DOCUMENTS

| | | | |
|---|---|---|---|
| 5,078,921 A | | 1/1992 | Zipperian |
| 5,580,463 A | * | 12/1996 | Hubred .............. B01D 17/0205 210/221.2 |
| 5,584,995 A | * | 12/1996 | Meekel .............. B01D 17/0205 210/221.2 |
| 5,676,823 A | | 10/1997 | McKay et al. |
| 6,511,054 B1 | | 1/2003 | Green |

OTHER PUBLICATIONS

SlamJet™ Spargers | Eriez Flotation Division [Viewed on internet on Jan. 13, 2017] Viewed on internet. <URL: http://www.eriezflotation.com/sparging/slamjet-sparger/> published on Aug. 9, 2014 as per Wayback Machine.
Australian Patent Office International-Type Search Report for Application No. 2016/901714 dated Jan. 23, 2017 (9 pages).
International Search Report and Written Opinion for Application No. PCT/AU2017/000102 dated Jul. 3, 2017 (13 pages).

* cited by examiner

AERATING LANCE ASSEMBLY AND
AERATION TANK INCORPORATING SAME

FIELD OF THE INVENTION

The present invention relates to the field of fluid aeration and, in particular, fluid aeration in a tank of the type having a fluid aerator or aerators requiring removal for cleaning and/or maintenance. The aeration tank of the present invention may be a Moving Bed Bioreactor or Moving Bed Biofilm Reactor (MBBR) tank forming part of an MBBR wastewater treatment system, although the aeration tank of the present invention may also have utility in other applications. The invention further relates to an aerating lance assembly for use in an aeration tank.

BACKGROUND OF THE INVENTION

It is to be understood at the outset that reference herein to an "enclosed" tank does not necessarily require that the tank headspace be a vacuum or that there is no means of access to inside the tank. It will become evident from a reading of this specification that the tank headspace need not be a vacuum and that an "enclosed" tank may well include within its scope a tank that includes an access port. Such a port may, during an aeration process, remain closed to avoid escape of odorous gases and to vent the tank above a roof line but at other times may be opened to allow partial or full access to inside the tank.

There exist a multitude of industrial applications requiring the use of an aeration tank for introducing compressed air into fluid held in the tank. One example is an MBBR tank which utilizes MBBR technology, a biological process used for wastewater treatment based on organisms/microbes attaching themselves to plastic bio-media (fixed film organisms). Most MBBR systems use aerobic processes which require the introduction of compressed air into liquor (a mixture of bio-media, treated water and introduced wastewater) held in the tank. The bio media grows a thin film of micro-organisms (biomass) on the surface of the plastic media which are kept in the tank by means of a screen on an outlet pipe of the tank which in turn allows fluid to exit the tank but not the plastic bio media. The large surface area of the plastic bio-media provides abundant surface area for microbial growth.

Wastewater enters the MBBR tank and the biomass attached to the surface of the bio-media degrades organic matter resulting in biochemical oxygen demand (BOD) removal and/or nitrification depending on the type and characteristic of the wastewater. The treated wastewater, containing some excess microbes which sloth off the media, may then flow through the screen to a downstream clarifier or dissolved air flotation system where the biomass and solids may be separated from the wastewater.

Most MBBR tanks are open top concrete or steel tanks or specially fabricated open top panel tanks. Air is typically compressed using blowers and transports the compressed air to the tanks via a series of pipelines from the top of the tank and then into diffusers positioned on the bottom of the tank. The diffusers are often coarse bubble diffusers with small holes drilled in the diffuser pipelines (also known as diffuser air manifolds). These air diffusers, which are typically constructed of expensive stainless steel, are either fixed to the floor of the tank or, depending on the size of the floor, are held down by their rigidity and weight to overcome the buoyancy effect of the displaced water. Coarse bubble diffusers uniformly placed at the bottom of the tank maintain the necessary level of dissolved oxygen (DO) concentration for BOD removal or nitrification.

In an MBBR tank, the holes in the diffuser pipelines can accumulate growth which causes blockages, or foreign objects can lodge in the diffuser pipeline holes. If the diffusers blocks, break or corrode, the diffusers need to be removed from the tank and this generally requires the liquor to be drained from the tank and the bio-media removed. This can be a time consuming process and the treatment process must be halted for an extended period of time to allow for cleaning and/or maintenance of the MBBR tank diffusers. Generally the tanks need to be completely drained and a substantial proportion of the bio-media needs to be removed to allow access to the air pipelines and diffusers. This can take a number of days at considerable cost. In addition, while the cleaning or repairs are taking place the treatment plant is not available to treat the wastewater, which in turn may lead to failure to comply with environmental discharge standards for the treated effluent.

In addition, because the top of the MBBR tank is open, the tank contents are open to atmosphere and therefore the spent air cannot be collected and vented to atmosphere via a vent pipe or passed through an odour scrubber or like equipment used to remove any odourous gases, if present, from the spent air. In addition, many MBBR tanks need to be installed in enclosed buildings to shield the appearance from neighbours, protect the system from the environment or to abate noise levels. It is therefore often desirable to collect the spent air and vent it separately via a vent pipe directly to atmosphere outside the building to prevent excessive humidification inside the building and/or to emit potential odorous gases from inside the building. Attempting to un-cover and re-cover a conventional MBBR tank with conventional diffusers for every cleaning or repair process is an extremely complex process and can incur considerable capital costs and ongoing operating costs if required to be removed during maintenance periods.

Accordingly, there is a need for an aeration assembly or an aeration tank incorporating same that allows for the removal of aerating diffuser(s) for the purpose of cleaning and/or maintenance of the diffuser(s) without needing to drain the tank or stop the aeration process. In the case of MBBR tanks, the tanks are also filled with bio-media which makes the tanks more difficult to drain and empty. In addition, the aerating diffusers are more prone to damage or becoming blocked and therefore require more regular cleaning. In the case of aeration processes which produce spent air with high humidity or which produce unpleasant odours, there is a need for an enclosed aeration tank which, in view of tank being covered, also allows for the removal of aerating diffusers from an exterior location.

It is an object of the present invention to overcome at least some of the aforementioned problems or to provide the public with a useful alternative.

SUMMARY OF THE INVENTION

In one aspect, the present invention provides a lance assembly for an aeration tank holding liquid to be aerated, said lance assembly including at least one lance pipe which when fully inserted extends into the tank, the lance pipe positioned relative to an operating liquid level of the tank such that the lance pipe is at least partially immersed in said liquid when the tank is filled to the operating liquid level, wherein at least a portion of the lance pipe at or adjacent an aerating end thereof includes a means of introducing air into the liquid to thereby aerate the liquid, and pipework associated with the lance pipe that includes pipework for directing air into the lance pipe, the pipework including a means of restricting the supply of air into the lance pipe, a means of restricting flow of liquid from inside the tank into the pipework which is not operable to restrict the flow of liquid when the lance pipe is inserted, wherein the means of restricting the flow of liquid is located downstream of the means of restricting the supply of air, and an isolation spacer located therebetween including a seal that restricts the flow of liquid during retrieval of the lance pipe after the means of restricting the supply of air is operated to restrict the supply of air into the lance pipe, the isolation spacer configured to accommodate the inserted lance pipe and enable retrieval of the lance pipe to a position in which the aerating end of the lance pipe is located upstream of the means of restricting flow of liquid and downstream of the seal to enable the means of restricting the flow of liquid to be operated to restrict the flow of liquid therethrough.

The words "upstream" and "downstream" as used in this specification to describe the location of certain components is with reference to a direction of flow of air from an external source to inside the aeration tank via the pipework and lance pipe.

Further, the word "restrict" as used in this specification with respect to the action of a valve in controlling the flow of liquid or air, includes within its scope a partial or complete prevention of said flow through the valve.

In an embodiment, the means of restricting the supply of air to the lance pipe is a first valve associated with the pipework, wherein closing or at least partial closing of the first valve restricts flow of said air supply.

In an embodiment, the means of restricting flow of liquid is a second valve associated with the pipework which, when opened or at least partially opened, allows for retrieval of the lance pipe through the second valve.

In an embodiment, the isolation spacer is of a greater cross sectional dimension to that of the lance pipe which extends inside the isolation spacer.

In an embodiment, the pipework further includes a pipe union located upstream of the isolation spacer and downstream of the first valve, wherein an annular groove is formed inside a space between an end of the isolation spacer and an inside ridge of the pipe union.

In an embodiment, the lance pipe and pipework is of a circular cross section, and the seal is an annular rubber seal or O-ring positioned inside the annular groove, the seal restricting the flow of liquid when the second valve is open and after the lance pipe is retrieved to a point beyond the second valve but not beyond the seal.

In an alternative embodiment, the seal is positioned between an internal wall of the isolation spacer and an external wall of the lance pipe, the seal restricting the flow of liquid when the second valve is open and after the lance pipe is retrieved to a point beyond the second valve but not beyond the seal.

In the alternative embodiment, the lance pipe and pipework is of a circular cross section, and the seal is an annular rubber seal or O-ring positioned inside an annular groove associated with an internal wall of the isolation spacer.

In an embodiment, the pipe union, when disconnected, allows the lance pipe to move through the pipe union.

In an embodiment, the pipework further includes a valve union associated with the first valve which is located upstream of the first valve and which, when opened or partially opened, allows for the first valve to be disconnected from the pipework at a position upstream of the first valve.

In an embodiment, the lance pipe is retrievable from the tank together with a portion of the pipework between the valve union and the pipe union after the valve union is opened or partially opened to allow the first valve to be disconnected from the pipework and after the pipe union is disconnected to allow for retrieval of the lance pipe.

In an embodiment, the at least one lance pipe extends substantially horizontally through a side wall of the tank and adjacent a bottom of the tank such that the liquid held in the tank is aerated from a location adjacent the bottom of the tank.

In an embodiment, the pipework further includes a third valve upstream of the first valve which, when closed or partially closed, restricts flow of said air supply to the first valve.

In an embodiment, the first and third valves are disposed in a substantially vertical portion of said pipework.

In an embodiment, the second valve, isolation spacer and pipe union are disposed in a substantially horizontal portion of said pipework.

In an embodiment, the horizontal and vertical portions of pipework are connected via an elbow.

In an alternate embodiment, the first, second and third valve, isolation spacer and pipe union are disposed in a substantially horizontal pipework.

In an embodiment, the first, second and third valves are ball valves.

In an embodiment, the first, second and third valves are compact ball valves, or a combination of compact and non-compact ball valves.

In an embodiment, the isolation spacer is in the form of a non-return valve located upstream of the second valve and which automatically closes and restricts flow of liquid beyond the non-return valve after the lance pipe is retrieved beyond the non-return valve.

In an embodiment, the non-return valve is a check valve.

In another aspect, the present invention provides an aeration tank including an air supply pipe, and one or more lance assemblies configured according to the lance assembly of any one of paragraphs above, wherein each lance assembly is supplied air from the air supply pipe.

In an embodiment, the aeration tank includes a substantially upright wall and a plurality of said lance assemblies radially disposed about said substantially upright wall, the air supply pipe positioned about a perimeter of the substantially upright wall of the aeration tank and to which said pipework is connected such that air supplied to the air supply pipe is directed to each of the plurality of lance assemblies.

In an embodiment, the tank wall is a substantially upright wall having a circular cross section, and said air supply pipe is an air supply ring encircling the perimeter of the upright wall.

In an embodiment, the tank wall includes an aperture at each lance assembly location to accommodate each lance pipe, each aperture having associated therewith a tank adapter through which the lance pipe extends.

In an embodiment, the aeration tank further includes a cover which with the floor and wall forms a substantially enclosed tank.

In an embodiment, the aeration tank is an MBBR tank including an inlet for wastewater to be treated and a screened outlet which allows for treated wastewater to exit the tank while preventing flow through of bio-media, and one or more manholes capable of being opened to allow access inside the tank.

In an embodiment, the aeration tank further includes a means of directing spent air in a headspace of the tank to an odour scrubber.

In another aspect, the present invention provides a method of retrieving the lance pipe assembly of any one of the above paragraphs, including closing the third valve, closing the first valve, disconnecting the valve union associated with the first valve, disconnecting the pipe union, retrieving the lance pipe beyond the second valve but before the seal such that the aerating end of the lance pipe is located inside the isolation spacer, closing the second valve, and completing removal of the lance pipe by retrieving the lance pipe beyond the seal.

In yet another aspect, the present invention provides a method of inserting the lance pipe assembly of any one of above paragraphs, including with the first valve closed, inserting the lance pipe beyond the seal but before the second valve such that the aerating end of the lance pipe is located inside the isolation spacer, opening the second valve, completing insertion of the lance pipe by pushing the lance pipe beyond the second valve into the aeration tank, connecting the pipe union, connecting the valve union associated with the first valve, opening the first valve, and opening the third valve.

According to yet another aspect, the present invention provides a method of removing, from an aeration tank, a lance pipe assembly including pipework and a lance pipe that is immersed in liquid and configured to aerate the liquid with air directed into the pipework from an external air supply, the method including providing the pipework at an entry point for said lance pipe into the tank such that said lance pipe extends substantially horizontally, said entry point being below an operating liquid level of the tank, said pipework including a first valve which when closed restricts the air supply to the lance pipe, a valve union upstream of the first valve which when disconnected enables removal of the first valve and associated downstream pipework, a second valve located downstream of the first valve which when closed restricts flow of liquid out from the tank, and an isolation spacer and pipe union disposed between the first and second valves, closing the first valve to restrict air supply downstream of the first valve, disconnecting the valve union to enable removal of the first valve and associated downstream pipework, disconnecting the pipe union to enable movement of the lance pipe therethrough, and retrieving the lance pipe and a portion of the pipework between the disconnected pipe union and disconnected valve union such that an aerating end of the lance pipe is retrieved beyond the second valve, and closing the second valve to restrict liquid flow out of the tank beyond the second valve.

In an embodiment, the pipework further includes a third valve upstream of the first valve to isolate air supply to the first valve, the method further including closing the third valve prior to closing the first valve.

In an embodiment, the isolation spacer is of a greater cross sectional dimension to that of the lance pipe which extends inside the isolation spacer, the isolation spacer including said pipe union at an upstream end thereof which when disconnected allows the lance pipe to move through the pipe union, and a seal disposed between an upstream end of the isolation spacer and a downstream ridge portion of the pipe union to thereby restrict flow of liquid when the second valve is open and after the lance pipe is retrieved beyond the second valve but not beyond the seal, wherein the method further includes, prior to closing the second valve, retrieving the lance pipe to a point where the aerating end of the lance pipe is retrieved beyond the second valve but before the seal such that the aerating end of the lance pipe is located inside the isolation spacer when the second valve is closed, and after closing the second valve, completing removal of the lance pipe by retrieving the lance pipe beyond the seal.

BRIEF DESCRIPTION OF THE DRAWINGS

Features of the present disclosure are illustrated by way of example and not limited in the following figure(s), in which like numerals indicate like elements, in which.

Figure 1:
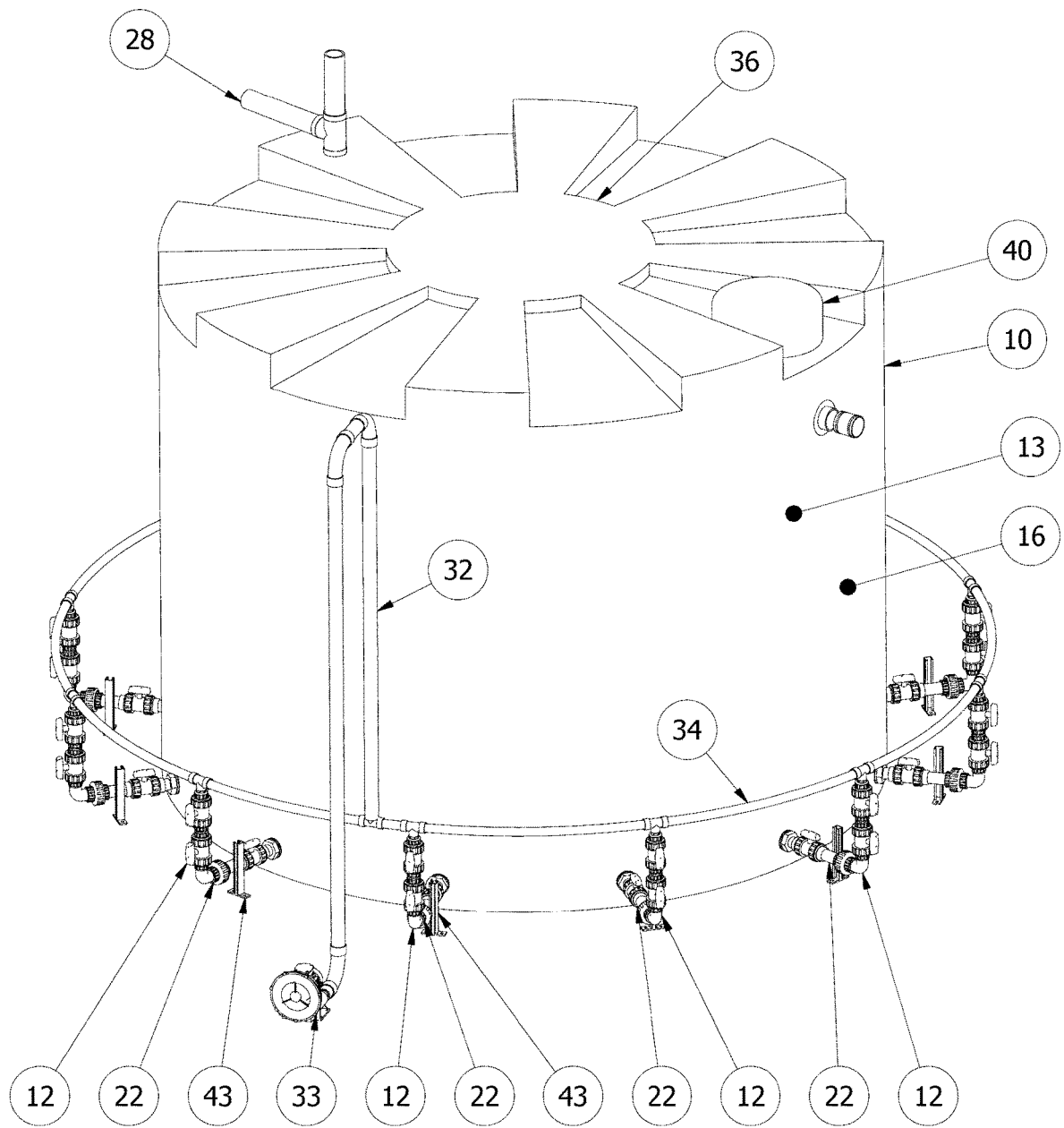
FIG. 1 illustrates an external perspective view of an aeration tank incorporating at least one lance assembly according to an embodiment of the present invention.

LIST OF FEATURES 10 aeration tank
12 lance assembly
12a lance assembly
12b lance assembly
12c lance assembly
12d lance assembly
12e lance assembly
13 tank body
14 tank base/tank floor
16 tank wall 18 liquid/water
20 lance/lance pipe
22 pipework
24 lance pipe apertures
26 bio-media
28 wastewater inlet pipe
30 effluent outlet screen
32 air inlet pipe
33 air source/blower
34 air supply ring pipe
36 tank cover
38 headspace
40 manhole
42 tank adapter
43 structural brace
44 first valve
46 upstream valve union
48 bush
50 second valve
52 third valve
54 isolation spacer
56 seal/O-ring
58 upstream pipe union
60 upstream pipe union (female)
61 groove
62 upstream pipe union (male)
63 ridge
64 non-return valve/check valve
68 pipe union
70 second valve upstream pipe union
72 additional elbow

DETAILED DESCRIPTION OF THE EMBODIMENT(S) OF THE INVENTION

For simplicity and illustrative purposes, the present disclosure is described by referring mainly to an example or examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an aspect, the present invention relates to an aeration tank 10 including a tank body 13 including at least a tank floor or tank base 14 and a tank wall 16, the tank body 13 holding liquid 18 to be aerated, and at least one lance assembly 12 therefor, the lance assembly 12 including a lance or lance pipe 20 extending into the tank 10 below an operating liquid level of the tank 10 such that the lance pipe 20 is immersed in the liquid 18. The lance assembly 12 includes pipework 22 which may include pipework and other components for directing air into the lance pipe 20 and thereby into the liquid 18 to aerate the liquid 18, wherein at least the portion of lance pipe 20 extending into the tank 10, referred to herein as the aerating end of the lance pipe, includes one or more apertures 24 for introducing air into the liquid, and wherein the pipework 22 and lance pipe 20 are configured to allow for removal of the lance pipe 20 by an operator (not shown) from an external location of the tank.

An aspect of the present invention further relates to a lance assembly 12 as described above for use in an aeration tank 10, and methods of installing and removing the lance assembly 12. A lance assembly in a broad form is shown by example in FIG. 9, and may include just minimal components to ensure that a lance pipe 20 forming part of the assembly 12 is removable from a tank 10 and insertable into the tank 10, from an external location of the tank.

FIG. 1 illustrates an aeration tank 10 according to an embodiment of the present invention, incorporating a plurality of lance assemblies 12 which are also illustrated according to an embodiment. The reader will appreciate that the lance assemblies 12 shown in FIGS. 1-6 are the same as the lance assembly shown in FIG. 7 (described in more detail below), but it is to be understood that alternately configured lance assemblies may equally be used. Indeed, the reader will appreciate that additional lance assemblies are illustrated in FIGS. 8-13 and also described herein.

Figure 2:
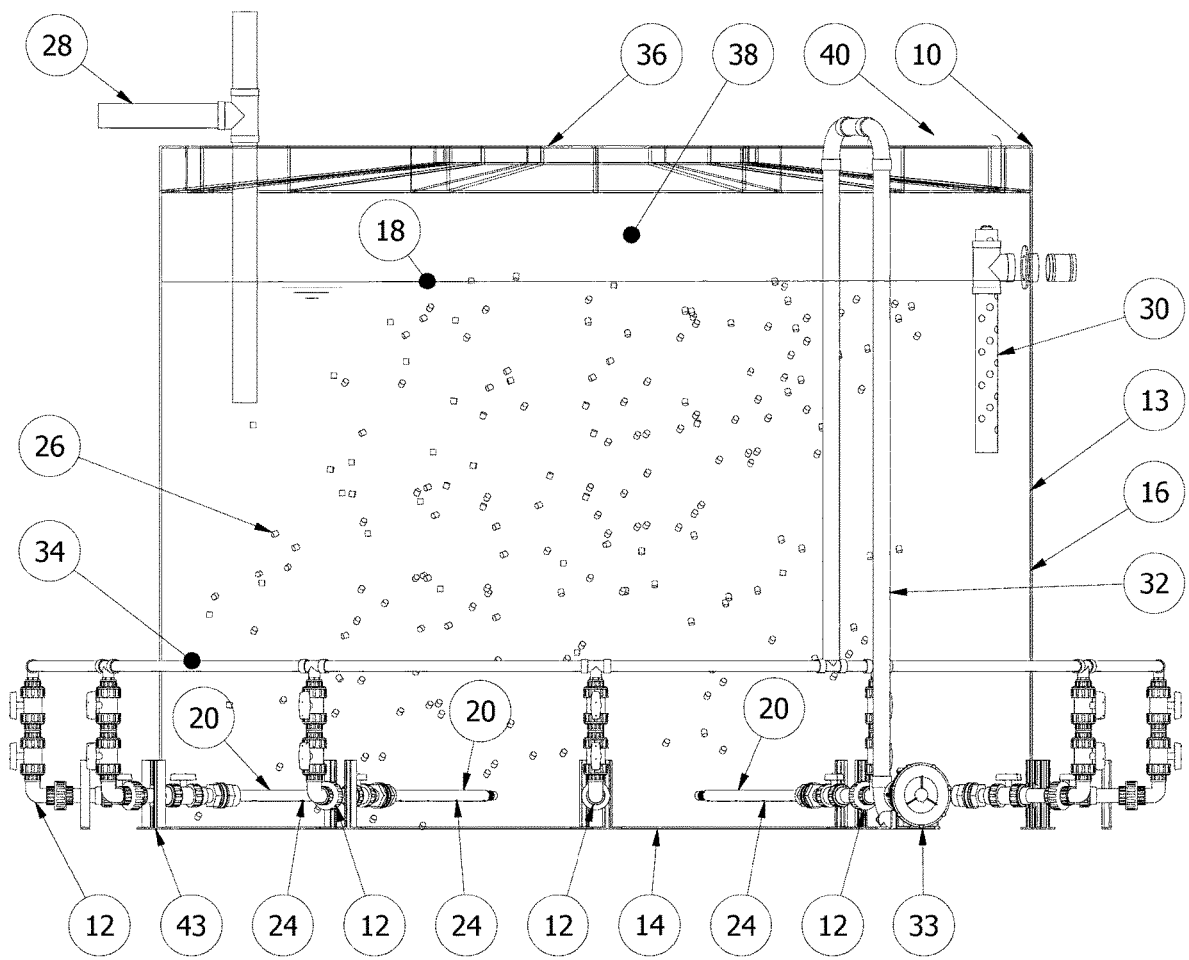
FIG. 2 illustrates a side view of the aeration tank of FIG. 1 configured as an MBBR tank, wherein certain parts of the tank are cut-away to expose various internal components.

As shown in FIG. 2, the aeration tank 10 may be an MBBR tank used in a waste water treatment process and incorporating bio media 26. The MBBR tank of this embodiment further includes a waste water inlet pipe 28 for introducing waste water, and effluent outlet screen 30 configured to allow flow of treated waste water but prevent the flow of bio media 26. The MBBR tank 10 may further include an air inlet pipe 32 for directing air from an external source, such as a blower 33, to an air supply ring pipe 34 encircling the tank 10 and to which each individual lance assembly 12 is connected such that air supplied to the air supply ring pipe 34 is directed into each of the individual lance assemblies 12.

In an embodiment, the aeration tank 10 may include a tank cover 36 which together with the floor 14 and wall 16 forms a substantially enclosed tank. The tank may further include a means of directing gas which forms in a headspace 38 of the tank to an odour scrubber (not shown) or similar air treatment apparatus or to an elevated vent pipe to atmosphere, and one or more man-holes 40 capable of being opened to allow limited access to inside the tank 10.

Each lance assembly 12 may be supported in an elevated position adjacent to the tank 10 partially by way of its connection to the air supply ring 34 and further by a tank adaptor 42 through which the lance pipe 20 extends into the tank. The air supply ring 34 and the tank adaptor 42 may be considered to form part of the pipework 22. Accordingly, reference to "pipework" herein is not intended to be limited to just pipes, and may also include other components including adaptors and valves and components that are spaced apart with no direct link or connection to one another.

The person skilled in the art would appreciate that the tank adaptor 42 provides a means of accommodating the lance pipe which extends through an aperture in the tank wall 16 and provides a sealed connection to the tank such that when the lance pipe 20 is inserted liquid from inside the tank 10 is not able to escape through a space that would otherwise exist between the perimeter of the aperture extending through the tank and the outer surface of lance pipe. A structural brace 43 may be used to further support the assembly 12, including pipework 22.

Figure 3:
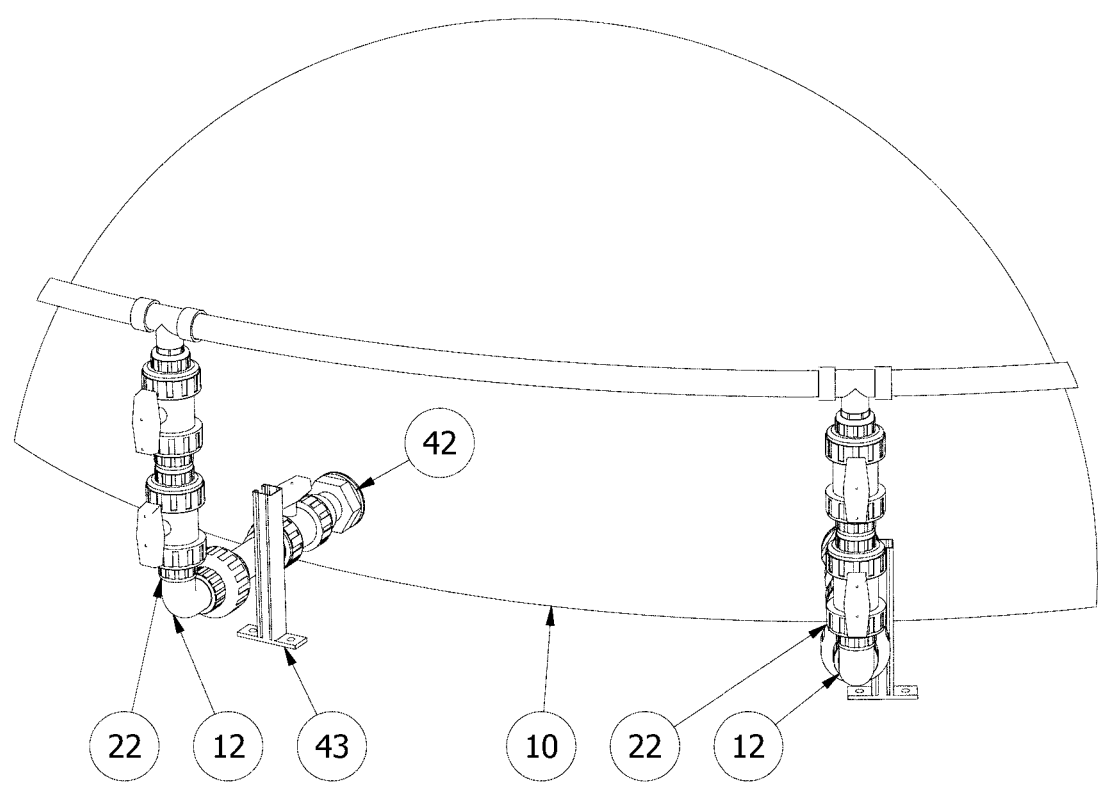
FIG. 3 illustrates an enlarged perspective view of an external portion of the aeration tank of FIG. 1 including two individual lance assemblies.
Figure 4:
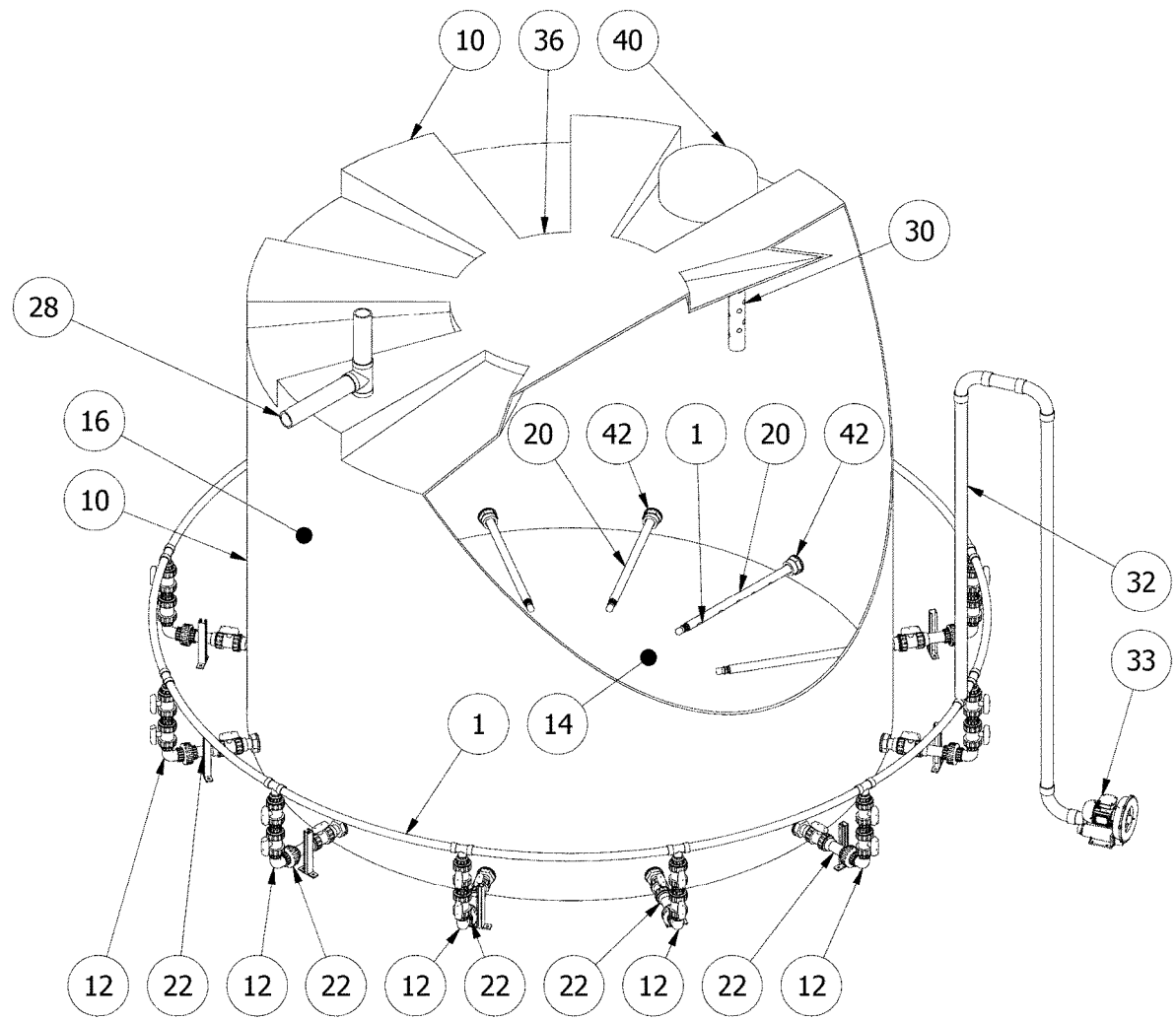
FIG. 4 illustrates the perspective view of FIG. 1 with a cut-away section illustrating some internal components of the tank.
Figure 5:
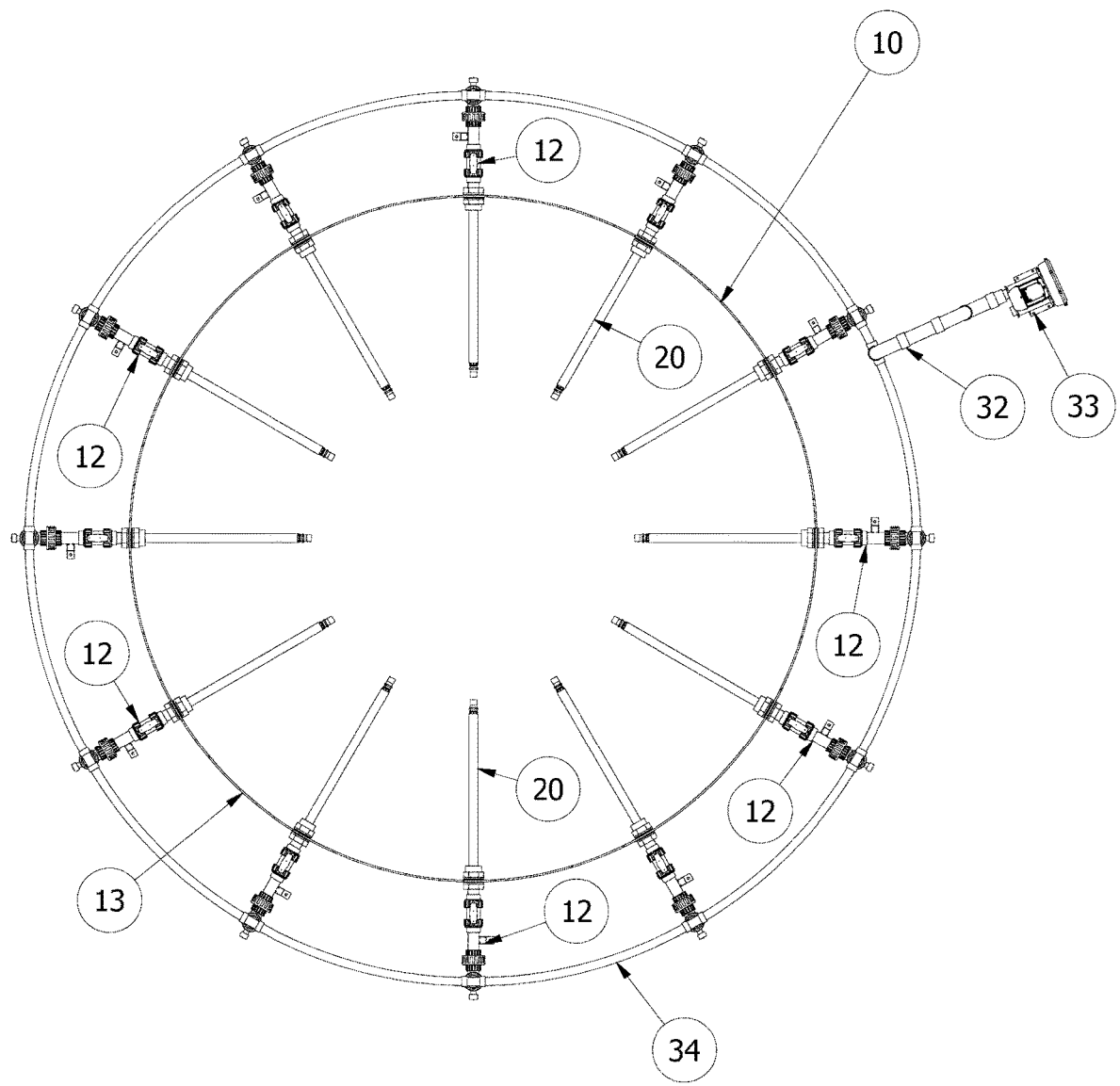
FIG. 5 illustrates a top view of the inside of the aeration tank of FIG. 1 showing lance pipes of each lance assembly extending part way into the tank.
Figure 6:
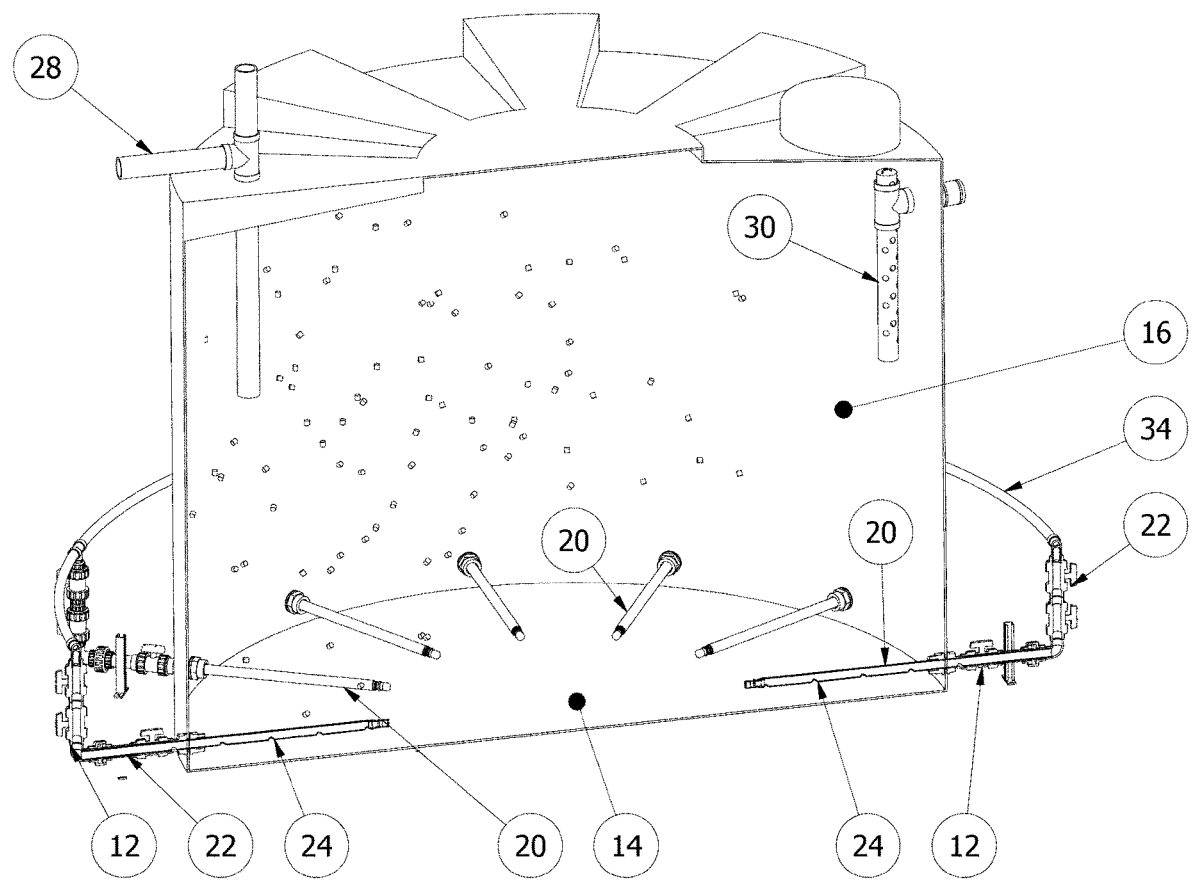
FIG. 6 illustrates a perspective section view of the tank of FIG. 1 configured as an MBBR tank.

FIGS. 3 through to 6 illustrate different views of the components which have been described above.

Figure 7A:
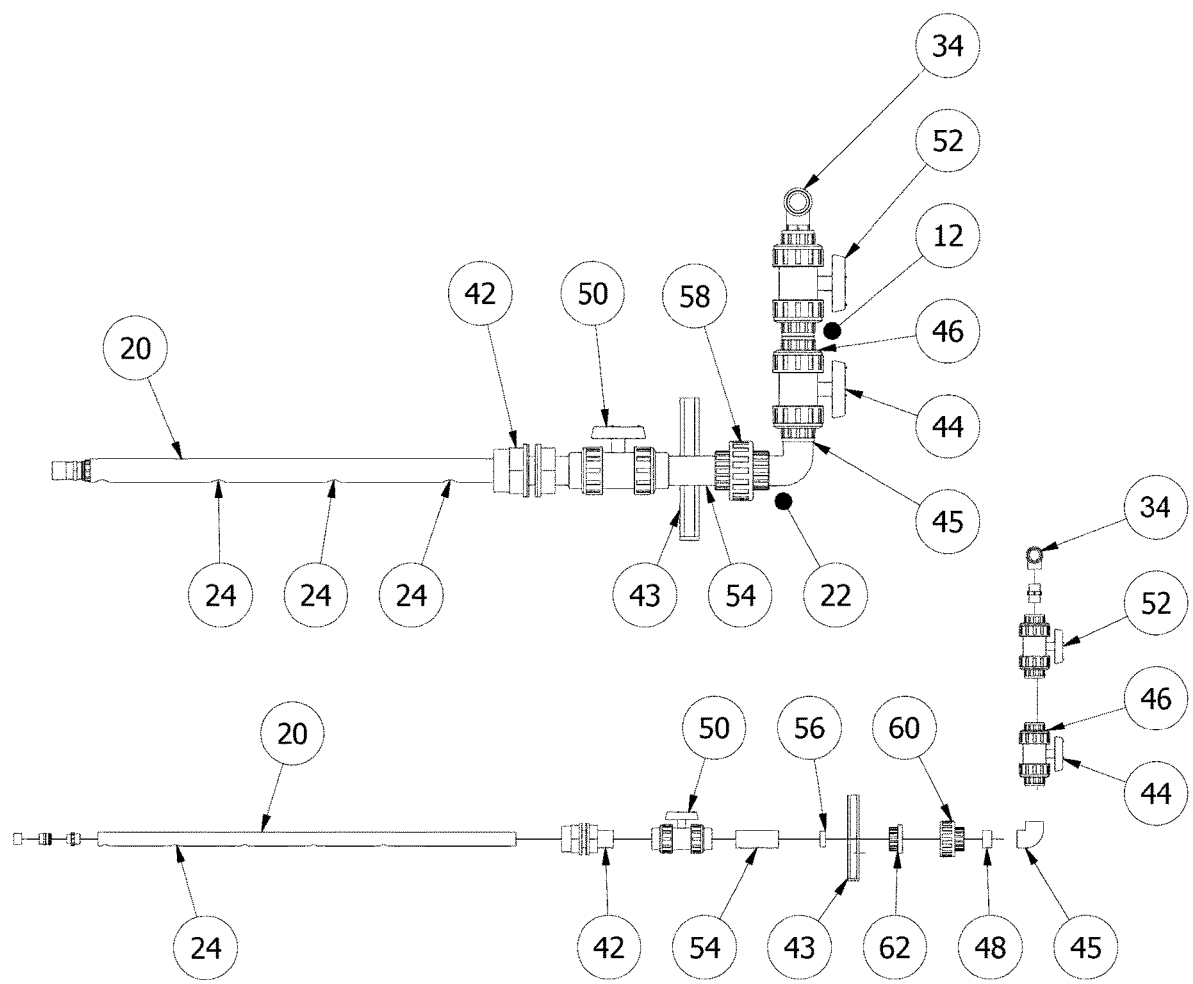
FIG. 7A illustrates an assembled and exploded side view of a lance assembly according to the lance assembly embodiment shown in FIGS. 1 to 6.
Figure 7B:
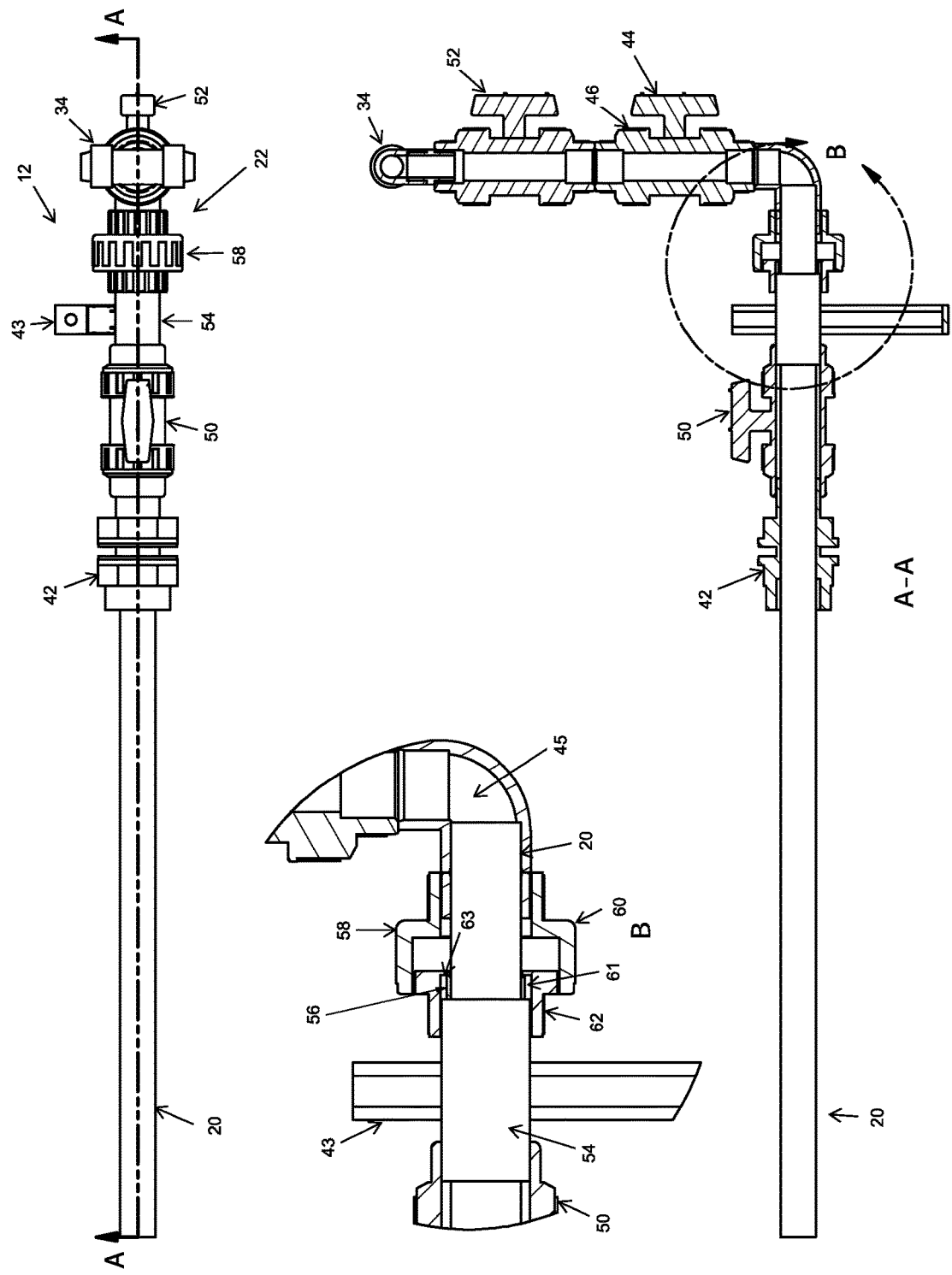
FIG. 7B illustrates a top view of a lance assembly according to the lance assembly embodiment shown in FIGS. 1 to 6, and a cross-sectional view of the lance assembly through axis A-A of the top view including an enlarged view of portion B.

FIGS. 7A and 7B illustrate the lance assembly 12 used in tank 10 of FIGS. 1-6 according to an embodiment. In this embodiment, the pipework 22 of the lance assembly 12 further includes a first valve 44 for isolating air supply from the air supply ring pipe 34 to the lance pipe 20. The first valve 44 may include an upstream valve union 46 which allows for the first valve 44 to be disconnected from the pipework 22 at a position upstream of the first valve 44. It will be appreciated that all valves described herein include an upstream and downstream union, however, only those relevant to removal of the lance pipe will be described specifically herein.

In an embodiment, the first valve 44 is associated with the lance pipe 20 such that this connection of the upstream valve union 46 contributes to enabling the removal of the lance pipe together with the first valve 44. It will become apparent that not all components of the lance assembly are removed with the lance pipe, and according to the embodiment shown in FIGS. 7A and 7B, only the first valve 44 and a downstream elbow 45 which connects the first valve 44 to the lance pipe 20 via a bush 48 are removed from the tank together with the lance pipe.

In an embodiment, the lance assembly 12 further includes a second valve 50 which is configured to restrict flow of liquid out from the tank 10 and is shown in the drawings as being located downstream of the first valve 44. When the second valve 50 is open, it allows for retrieval of the lance pipe through the second valve 50.

In an embodiment, the lance assembly 12 may further include a third valve 52 located upstream of the first valve 44. The third valve 52 is also used to isolate air supply from the air supply ring pipe 34, and by being located upstream of the first valve 44 may be closed to isolate supply of air to the first valve 44. In this way, the third valve 52 may be closed after the first valve 44 is closed in order to isolate air supply to the first valve 44 in anticipation of disconnecting the upstream valve union 46. Thus, the skilled addressee will appreciate that the initial steps of retrieving the lance pipe 20 may include closing the third valve 52 to isolate air supply from the air supply ring pipe 34 through to the first valve 44, closing the first valve 44 to restrict any fluid from flowing upstream beyond the first valve 44 after the air supply has stopped, and disconnecting the upstream valve union 46 associated with the first valve 44. In an alternative embodiment, the first valve 44 may be closed first, followed by the third valve 52.

In the embodiment shown, the first 44 and third 52 valves are positioned in a vertical portion of the pipework 22 leading up to the air supply ring 34, and the second valve 50 together with the tank adaptor 42 and lance pipe 20 are positioned in a horizontal portion of the pipework 22 extending towards the tank. However, as will become apparent in later embodiment(s), the present invention is not limited to this configuration.

The horizontal portion of the assembly 12 may further include components which allow for the lance pipe 20 to be retrieved through the tank adaptor 42 and the second valve 50, whilst preventing or restricting the flow of liquid out of the pipework 22. The skilled addressee will appreciate that in the absence of any such component(s), when one retrieves the lance pipe, liquid from inside of the tank will gush out through the second valve 50 until the second valve 50 is closed.

In the embodiment shown, the horizontal portion of pipework 22 includes an isolation spacer 54 having associated therewith a seal 56, which may be an annular rubber seal, and further upstream of these components is a pipe union 58 including female pipe union component 60 and downstream male pipe union component 62. The isolation spacer 54 is effectively a means of restricting flow of liquid out from the pipework 22 when the second valve 50 is open and during retrieval of the lance pipe. The isolation spacer 54 is of a greater cross-sectional dimension to that of the lance pipe 20 which extends inside the isolation spacer 54. When the female and male pipe union components 60 and 62 are disconnected, and the valve union 46 associated with the first valve 44 is disconnected from the pipework 22, the lance pipe 20 together with the first valve 44 and elbow 45 of the associated pipework 22 are able to retrieved and the aerating end of the lance pipe 20 pulled through the tank adaptor 42 and open second valve 50, and into the isolation spacer 54.

An annular groove may accommodate the annular seal 56. For example, as shown most clearly in the cross-sectional views of FIG. 7B, a groove 61 may be formed by a connection between the isolation spacer 54 and the male pipe union component 62. The male pipe union component 62 is downstream of the female pipe union component 60 and is thus positioned at the upstream end of the isolation spacer 54. In this regard, the groove 61 may be formed between an end peripheral edge of the isolation spacer 54 and an inside ridge 63 of the male pipe union component 62. The seal positioned in this location provides a sealed environment inside the isolation spacer 54 when the lance pipe extends through, and continues to restrict flow of liquid out from the pipework 22 when the second valve 50 is open and after the lance pipe 20 is retrieved to a position beyond the second valve 50 but short of the seal 56. It is to be understood that the alternate seal configurations are possible, and in an alternative embodiment (not shown), the seal 56 may be sandwiched between an internal wall of the isolation spacer 54 and an external wall of the lance pipe 20. This will also provide a sealed environment inside the isolation spacer 54 and restrict flow of liquid out of the tank when the second valve 50 is open and after the lance pipe 20 is retrieved to a position beyond the second valve 50 but short of the seal 56.

Once the lance pipe 20 is retrieved to this position, the second valve 50 may be closed to shut off the primary flow of liquid out of the tank, and the lance pipe 20 may then be fully retrieved beyond the seal 56. The skilled addressee will appreciate that there may be some loss of liquid during this retrieval process, however, compared with not using the isolation spacer and seal in this particular pipework configuration, the loss will be minimal.

Once cleaning and/or maintenance has been performed on the removed lance pipe 20, it may be ready again for insertion. Insertion of the lance pipe 20 may involve firstly, with the first valve 44 closed, inserting the lance pipe 20 into the isolation spacer to a position in which the aerating end of the lance pipe is located downstream of the seal 56 but upstream of the second valve 50, opening the second valve 50, completing insertion of the lance pipe 20 by pushing the aerating end beyond the second valve 50 and beyond the tank adaptor 42 into the aeration tank, connecting the male and female pipe union components 60 and 62 to partially secure the lance pipe 20, connecting the upstream valve union 46 associated with the first valve 44 to complete the securing of the lance pipe assembly, then opening the first valve 44 and finally opening the third valve 52 to allow air to again flow through the lance assembly 12 and into the lance pipe 20.

Figure 8:
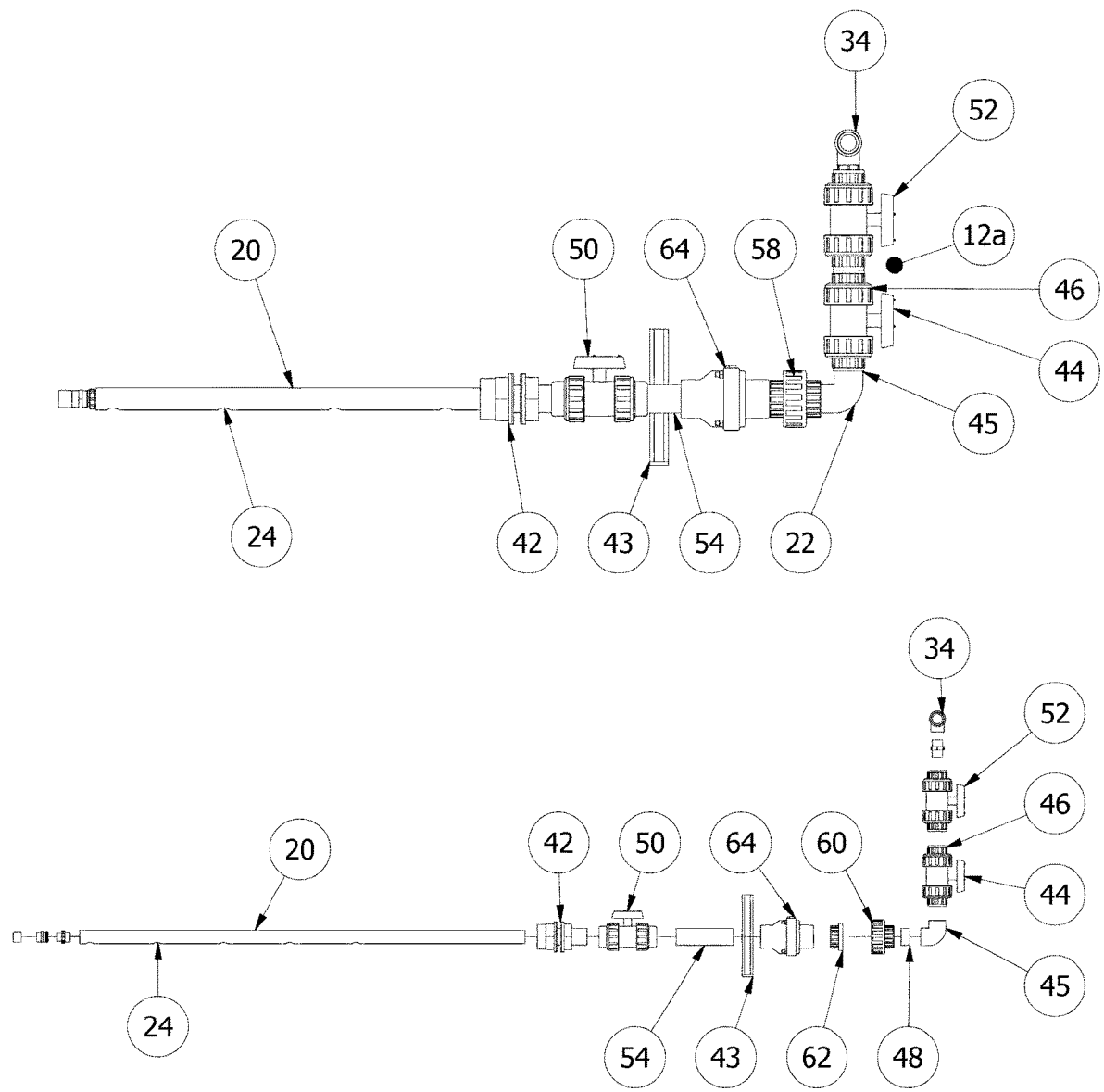
FIG. 8 illustrates an assembled and exploded side view of a lance assembly according to an alternative embodiment.

FIG. 8 illustrates an alternative embodiment similar to the embodiment of FIGS. 7A and 7B, but in place of seal 56, the illustrated lance assembly 12a includes a non-return valve 64 located between the isolation spacer 54 and pipe union 58 which functions to shut off flow of liquid from inside the tank beyond the non-return valve 64 once the aerating end of the lance pipe 20 is retrieved beyond the non-return valve 64. In an embodiment, the non-return valve 64 may be a check valve.

Lance assembly 12a and the additional lance assembly embodiments 12b-12e described below use reference numerals similar to those used above with respect to the lance assembly 12 when the same or like components are described.

Figure 9:
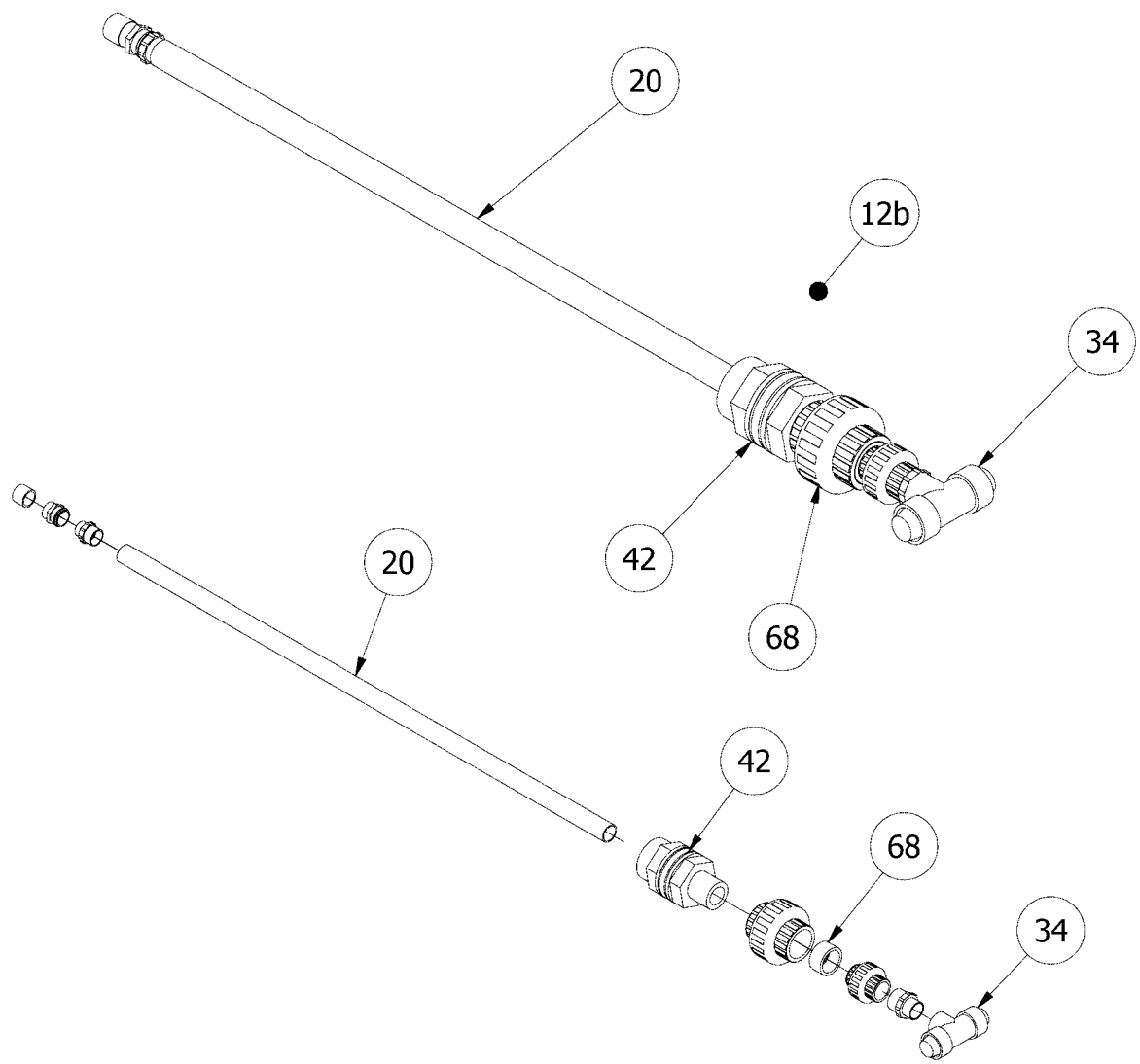
FIG. 9 illustrates an assembled and exploded perspective view of a lance assembly according to a further alternative embodiment.

Lance assembly 12b shown in FIG. 9 provides for less components and a lowering of the overall height of the valve assembly (including the ring pipe 34) in that the assembly does not include a vertical component extending up to the ring pipe 34. Lowering the height can provide benefits with site assembly and pipe supports.

The assembly 12b uses only a horizontal component, and therefore requires the use of deformable (e.g. plastic) pipework which allows some vertical movement of the ring pipe 34 to allow for retrieval of the lance pipe 20 which is aligned with the ring pipe. In other words, the air supply pipe ring 34 will need to be pulled away vertically to allow the lance 20 to be removed. In this embodiment, the pipework 22 includes just a pipe union 68 configured to be disconnected to allow for retrieval of the lance pipe 20. When used in an MBBR tank, use of this assembly 12b may require the tank 10 to be drained and the operator may expect some bio-media to spill upon removal of the lance 20.

Figure 10:
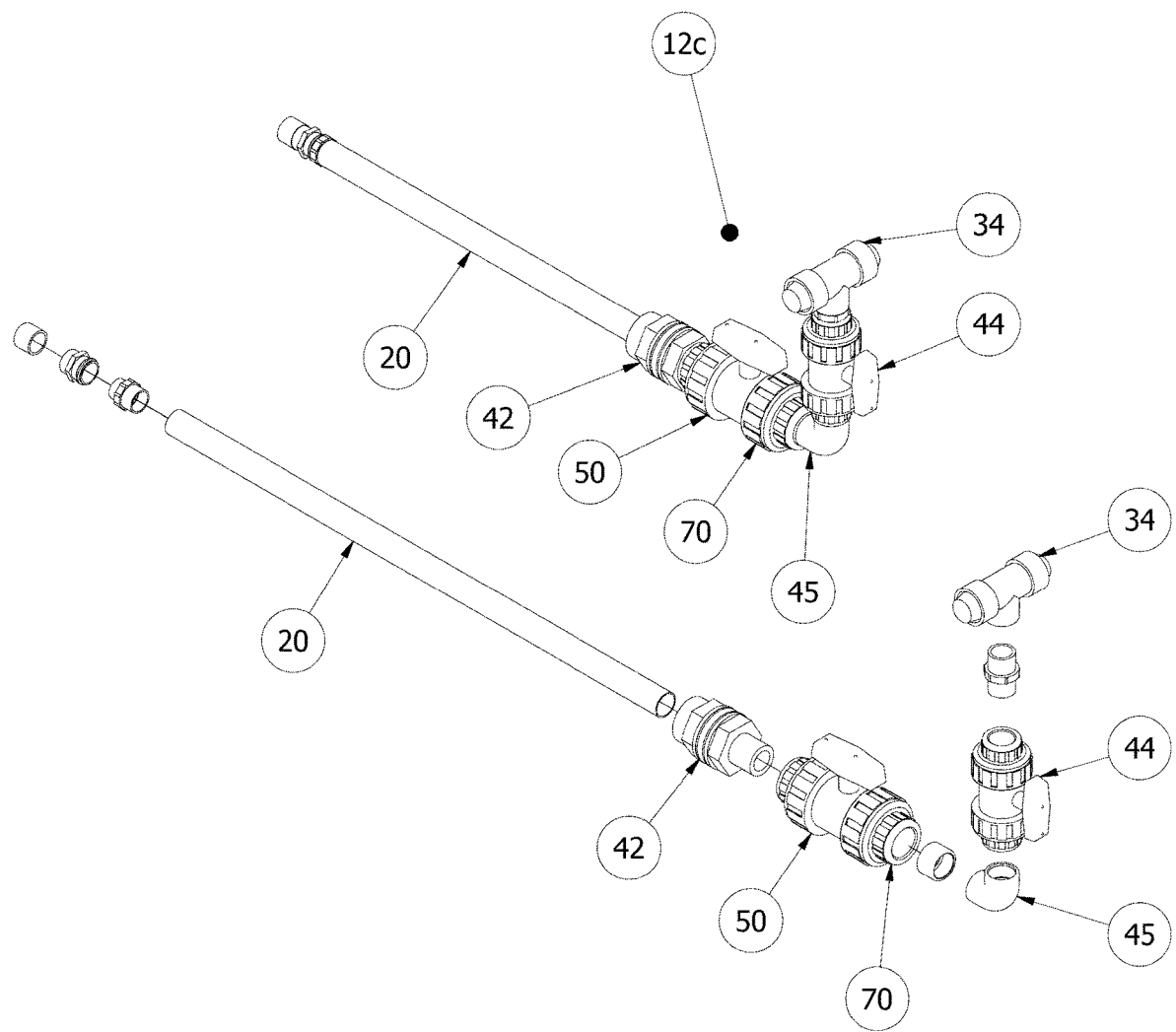
FIG. 10 illustrates an assembled and exploded perspective view of a lance assembly according to a still further alternative embodiment.

Lance assembly 12c shown in FIG. 10 is similar to the valve assembly 12 but does not include isolation spacer 54 or third valve 52. Assembly 12c uses only first valve 44 and second valve 50 whereby closure of the first valve 44 isolates the air supply, and then disconnection of the upstream union 70 of the second valve 50 allows the lance pipe 20 to be removed and the second valve 50 subsequently closed. When used in an MBBR tank, use of this assembly 12c may require the tank to be drained of liquid but bio-media is not expected to spill in view of the closure of second valve 50 upon retrieval of the lance pipe 20.

Figure 11:
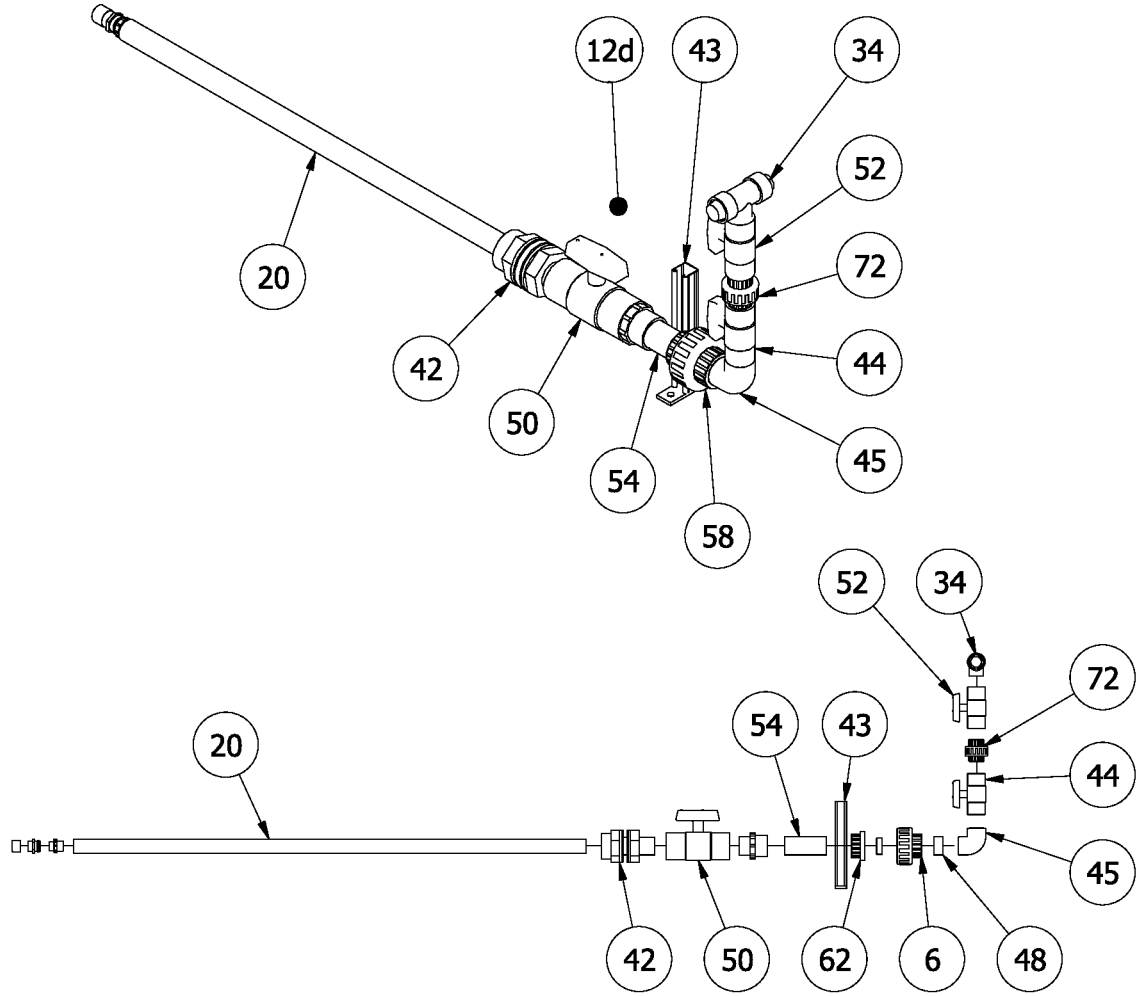
FIG. 11 illustrates an assembled and exploded perspective view of a lance assembly according to yet another alternative embodiment.

FIG. 11 shows a lance assembly 12d which is almost identical to lance assembly 12 except that the first 44, second 50 and third 52 valves are compact ball valves instead of standard ball valves. Compact ball valves are less sophisticated in that they do not include unions at upstream and downstream ends, and hence only those valves which require a union at an upstream or downstream end need include same. For example, the first valve 44 includes an upstream non-associated pipe union 72. The use of compact ball valves has the advantage of providing the operator with a clear understanding that they must disconnect only the pipe unions that are present without being confused over which valve-associated unions to disconnect.

Figure 12:
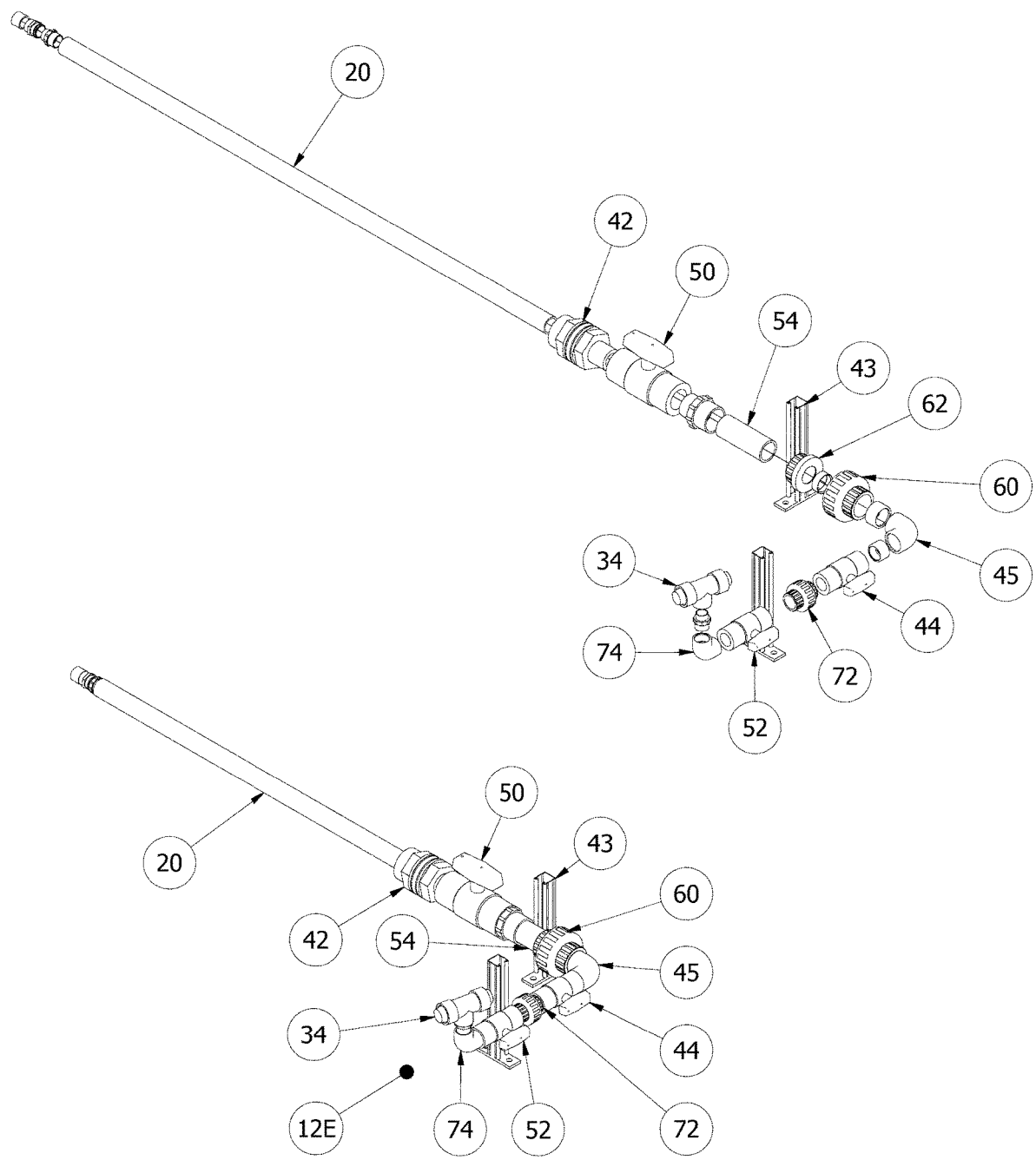
FIG. 12 illustrates an assembled and exploded perspective view of a lance assembly according to yet another alternative embodiment.

Lance assembly 12e of FIG. 12 is also almost identical to lance assembly 12 except it also provides for a lowering of the overall height of the valve assembly by placing more components along horizontal portions of pipework. This assembly 12e also uses compact ball valves which do not all have associated unions at ends thereof. This assembly 12e also has one additional elbow 74.

Figure 13:
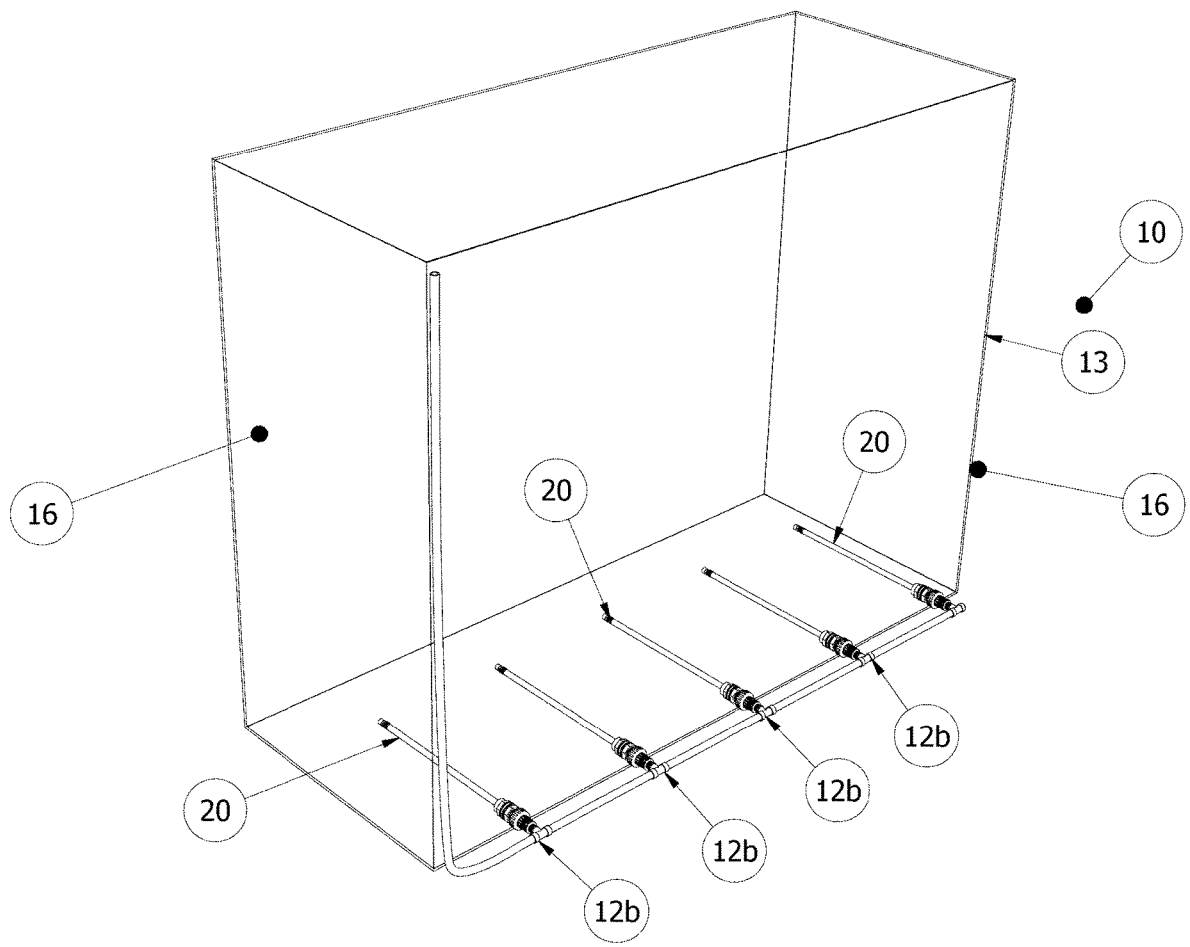
FIG. 13 illustrates a perspective view of an aeration tank according to an alternate embodiment in which the tank includes a substantially rectangular cross section, and associated lance assemblies according to the embodiment of FIG. 9.

It is to be understood that the aeration tank 10 need not be circular in cross section and may take any suitable form for the application in which the aeration tank is used. FIG. 13 shows an example of where the tank includes a substantially square cross section and thus includes more than one wall 16. Each of the lance assemblies shown in FIG. 13 resemble the tank assembly 12b of FIG. 9 in a very basic form which allows for retrieval of the lance pipe 20 by simply disconnecting a pipe union, however, any of the tank assemblies embodied herein could be used in association with this aeration tank 10.

The skilled addressee should now appreciate the advantages provided by the present invention which relates to a removable lance assembly and an aeration tank incorporating same. The lance pipe can be inserted through the wall of an aeration tank in such a way that it allows the removal of the lance pipe without draining the tank and without the need to remove the bio media (for example, when the tank is an MBBR tank). In addition, in tanks having multiple lance pipes connected to a single air supply, the air supply to all pipes need not be shut down to enable removal of one or more lance pipes. It also allows the MBBR tank to be covered to allow off gas to be vented or passed through an odour scrubber.

In an embodiment, the lance pipe and pipe work associated with each lance assembly is constructed of plastic pressure pipes and fittings, rather than metal or metallic pipes and fittings, although the present invention is not limited to plastic pressure pipes and fittings. Similarly, the aeration tank according to an embodiment is constructed of plastic, but the lance assembly and associated pipework components may equally well be fitted to a concrete or fabricated steel tank wall or any other type of tank material.

The various advantages afforded by the present invention include ease of installation of the air pipe lances, ease of removal of the air pipe lances, ability not to have to drain the tanks nor remove the bio media without draining the tank in the case of MBBR processes, ease of ability to collect the off gas from the MBBR and bend the tank or scrub the off gas, the decreased cost of fabrication and installation, and the decreased cost to maintain the system as compared with conventional MBBR tanks. In addition, the present invention allows individual lance pipes 20 to be removed during an aeration process, meaning that the aeration process does not necessarily need to be stopped to allow for removal of one or more lance pipes for cleaning/maintenance. The tank 10 as embodied herein, and in particular the manner in which the lance pipes 20 extend into the tanks in a radially spaced apart arrangement ensures that even if one or two or more lance pipes are removed, the remaining lance pipes in operation inside the tank will be sufficient to ensure that the necessary level of aeration continues.

Throughout this specification and claims which follow, unless the context requires otherwise, the word "comprise", and variations such as "comprises" and "comprising", will be understood to imply the inclusion of a stated integer or step, or group of integers or steps, but not the exclusion of any other integer or step, or group of integers or steps.

The reference to any prior art in this specification is not, and should not be taken as, an acknowledgement or any suggestion that the prior art forms part of the common general knowledge in Australia.

The claims defining the invention are as follows:

1. A lance assembly for an aeration tank holding liquid to be aerated, said lance assembly including:
    at least one lance pipe which when fully inserted through an aperture in a side wall of the tank extends into the tank, the lance pipe positioned relative to an operating liquid level of the tank such that the lance pipe is at least partially immersed in said liquid when the tank is filled to the operating liquid level, wherein at least a portion of the lance pipe at or adjacent an aerating end thereof includes a means of introducing air into the liquid to thereby aerate the liquid; and pipework associated with the lance pipe that includes:
  a pipe union which, when disconnected, enables the at least one lance pipe to become retrievable from the pipework,
  an adaptor associated with the side wall aperture of the tank, the adaptor configured to accommodate and at least partly support the at least one lance pipe when in the fully inserted position, the adaptor and the at least one lance pipe creating a seal when the at least one lance pipe is inserted to an extent that causes its aerating end to be located downstream of the adaptor such that liquid from inside the tank is prevented from exiting the tank through the side wall aperture
  a means of restricting a supply of air into the lance pipe, the means of restricting the supply of air located upstream of the pipe union,
  a means of restricting flow of liquid in an upstream direction through the pipework, the means of restricting the flow of liquid being inoperable when the lance pipe is in the fully inserted position, wherein the means of restricting the flow of liquid is located downstream of the pipe union and the means of restricting the supply of air and upstream of the adaptor,
  an isolation spacer located downstream of the pipe union and upstream of the means of restricting the flow of liquid, the isolation spacer including a seal that restricts the flow of liquid in the upstream direction through the pipework during retrieval of the lance pipe after the means of restricting the supply of air is operated to restrict the supply of air into the lance pipe and after the pipe union is disconnected to enable retrieval of the lance pipe, the isolation spacer configured to accommodate the inserted lance pipe and enable retrieval of the lance pipe to a position in which the aerating end of the lance pipe is located upstream of the adaptor and the means of restricting flow of liquid, and downstream of the seal, to enable the means of restricting the flow of liquid to be operated to restrict the flow of liquid therethrough.

2. A lance assembly according to claim 1, wherein:
the means of restricting the supply of air to the lance pipe is a first valve associated with the pipework, wherein closing of the first valve restricts flow of said air supply;
the means of restricting flow of liquid is a second valve associated with the pipework which, when opened, allows for retrieval of the lance pipe through the second valve;
the isolation spacer is of a greater cross sectional dimension to that of the lance pipe which extends inside the isolation spacer; and
the seal restricts the flow of liquid when the second valve is open and after the lance pipe is retrieved to a point beyond the second valve but not beyond the seal.

3. A lance assembly according to claim 2, wherein:
the pipe union is located downstream of the first valve, and an annular groove for accommodating the seal is formed inside a space between an end of the isolation spacer and an inside ridge of the pipe union;
the pipe union, when disconnected, allows the lance pipe to move through the pipe union;
the pipework further includes a valve union associated with the first valve which is located upstream of the first valve and which, when opened, allows for the first valve to be disconnected from the pipework at a position upstream of the first valve; and
the lance pipe is retrievable from the tank together with a portion of the pipework downstream of the valve union and upstream of the pipe union, after the valve union is opened to allow the first valve to be disconnected from the pipework and after the pipe union is disconnected to allow for retrieval of the lance pipe.

4. A lance assembly according to claim 3, wherein the lance pipe an pipework is of a circular cross section, and the seal is an annular rubber seal or O-ring positioned inside the annular groove formed between the isolation spacer and the pipe union.

5. A lance assembly according to claim 2, wherein:
the seal is positioned between an internal wall of the isolation spacer and an external wall of the lance pipe, the seal restricting the flow of liquid when the second valve is open and after the lance pipe is retrieved to a point beyond the second valve but not beyond the seal;
the lance pipe and pipework is of a circular cross section, and the seal is an annular rubber seal or O-ring positioned inside an annular groove associated with an internal wall of the isolation spacer;
the pipe union is located downstream of the first valve which, when disconnected, allows the lance pipe to move through the pipe union;
the pipework further includes a valve union associated with the first valve which is located upstream of the first valve and which, when opened or partially opened, allows for the first valve to be disconnected from the pipework at a position upstream of the first valve; and
the lance pipe is retrievable from the tank together with a portion of the pipework between the valve union and the pipe union after the valve union is opened to allow the first valve to be disconnected from the pipework and after the pipe union is disconnected to allow for retrieval of the lance pipe.

6. A lance assembly according to claim 1, wherein the at least one lance pipe extends substantially horizontally through the side wall of the tank and adjacent a bottom of the tank such that the liquid held in the tank is aerated from a location adjacent the bottom of the tank.

7. A lance assembly according to claim 3, wherein the pipework further includes a third valve upstream of the first valve which, when closed, restricts flow of said air supply to the first valve.

8. A lance assembly according to claim 7, wherein:
the first and third valves are disposed in a substantially vertical portion of said pipework;
the second valve, isolation spacer and pipe union are disposed in a substantially horizontal portion of said pipework; and
the horizontal and vertical portions of pipework are connected via an elbow.

9. A lance assembly according to claim 7, wherein the first, second and third valve, isolation spacer and pipe union are disposed in a substantially horizontal pipework.

10. A lance assembly according to claim 7, wherein the first, second and third valves are ball valves, or compact ball valves, or a combination of compact and non-compact ball valves.

11. A lance assembly according to claim 2, wherein the isolation spacer is in the form of a check valve located upstream of the second valve and which automatically closes and restricts flow of liquid beyond the check valve after the lance pipe is retrieved beyond the non-return valve.

12. An aeration tank including an air supply pipe and one or more lance assemblies configured according to the lance assembly of claim 1, wherein each lance assembly is supplied air from the air supply pipe.

13. A aeration tank according to claim 12, wherein:
the aeration tank includes a substantially upright wall and a plurality of said lance assemblies radially disposed about said substantially upright wall, the air supply pipe positioned about a perimeter of the substantially upright wall of the aeration tank and to which said pipework is connected such that air supplied to the air supply pipe is directed to each of the plurality of lance assemblies;
the tank wall is a substantially upright wall having a circular cross section, and said air supply pipe is an air supply ring encircling the perimeter of the upright wall; and
the tank wall includes an aperture at each lance assembly location to accommodate each lance pipe, each aperture having associated therewith the tank adaptor through which the lance pipe extends.

14. An aeration tank according to claim 12, further including a cover with which the floor and wall forms a substantially enclosed tank.

15. An aeration tank according to claim 12, wherein:
the aeration tank is an MBBR tank including an inlet for wastewater to be treated and a screened outlet which allows for treated wastewater to exit the tank while preventing flow through of bio-media; and
the aeration tank further includes a means of directing spent air in a headspace of the tank to an odour scrubber.

16. A method of removing, from an aeration tank, a lance pipe assembly including pipework and a lance pipe that is immersed in liquid and configured to aerate the liquid with air directed into the pipework from an external air supply, the method including:
providing the pipework at an entry point for said lance pipe into the tank such that said lance pipe extends substantially horizontally, said entry point including an aperture in a side wall of the tank and an associated adaptor, the adaptor and the lance pipe seal creating a seal when the lance pipe is inserted to an extent that causes an aerating end of the lance pipe to be located downstream of the adaptor such that liquid from inside the tank is prevented from exiting the tank through the side wall aperture said entry point being below an operating liquid level of the tank, said pipework including a first valve which when closed restricts the air supply to the lance pipe, a valve union upstream of the first valve which when opened enables removal of the first valve and associated downstream pipework, a second valve located downstream of the first valve which when closed restricts flow of liquid in an upstream direction through the pipework, and an isolation spacer and pipe union disposed between the first and second valves, the pipe union, when disconnected, enabling the at least one lance pipe to become retrievable from the pipework;
closing the first valve to restrict air supply downstream of the first valve;
opening the valve union to enable removal of the first valve and associated downstream pipework;
disconnecting the pipe union to enable retrieval of the lance pipe;
retrieving the lance pipe and a portion of the pipework between the disconnected pipe union and opened valve union such that the aerating end of the lance pipe is retrieved beyond the second valve and into the isolation spacer; and
closing the second valve to restrict liquid flow out of the tank beyond the second valve.

17. A method according to claim 16, wherein:
the pipework further includes a third valve upstream of the first valve to isolate air supply to the first valve, the method further including:
closing the third valve prior to or after closing the first valve but before opening the valve union; and
the isolation spacer is of a greater cross sectional dimension to that of the lance pipe which extends inside the isolation spacer, the isolation spacer including said pipe union at an upstream end thereof which when disconnected allows the lance pipe to move through a portion of the pipe union, and a seal disposed between an upstream end of the isolation spacer and a downstream ridge portion of the pipe union to thereby restrict flow of liquid when the second valve is open and after the lance pipe is retrieved beyond the second valve but not beyond the seal, wherein the method further includes:
prior to closing the second valve, retrieving the lance pipe to a point where the aerating end of the lance pipe is retrieved beyond the second valve but before the seal such that the aerating end of the lance pipe is located inside the isolation spacer when the second valve is closed, and after closing the second valve, completing removal of the lance pipe by retrieving the lance pipe beyond the seal.

* * * * *